United States Patent Office 2,706,172
Patented Apr. 12, 1955

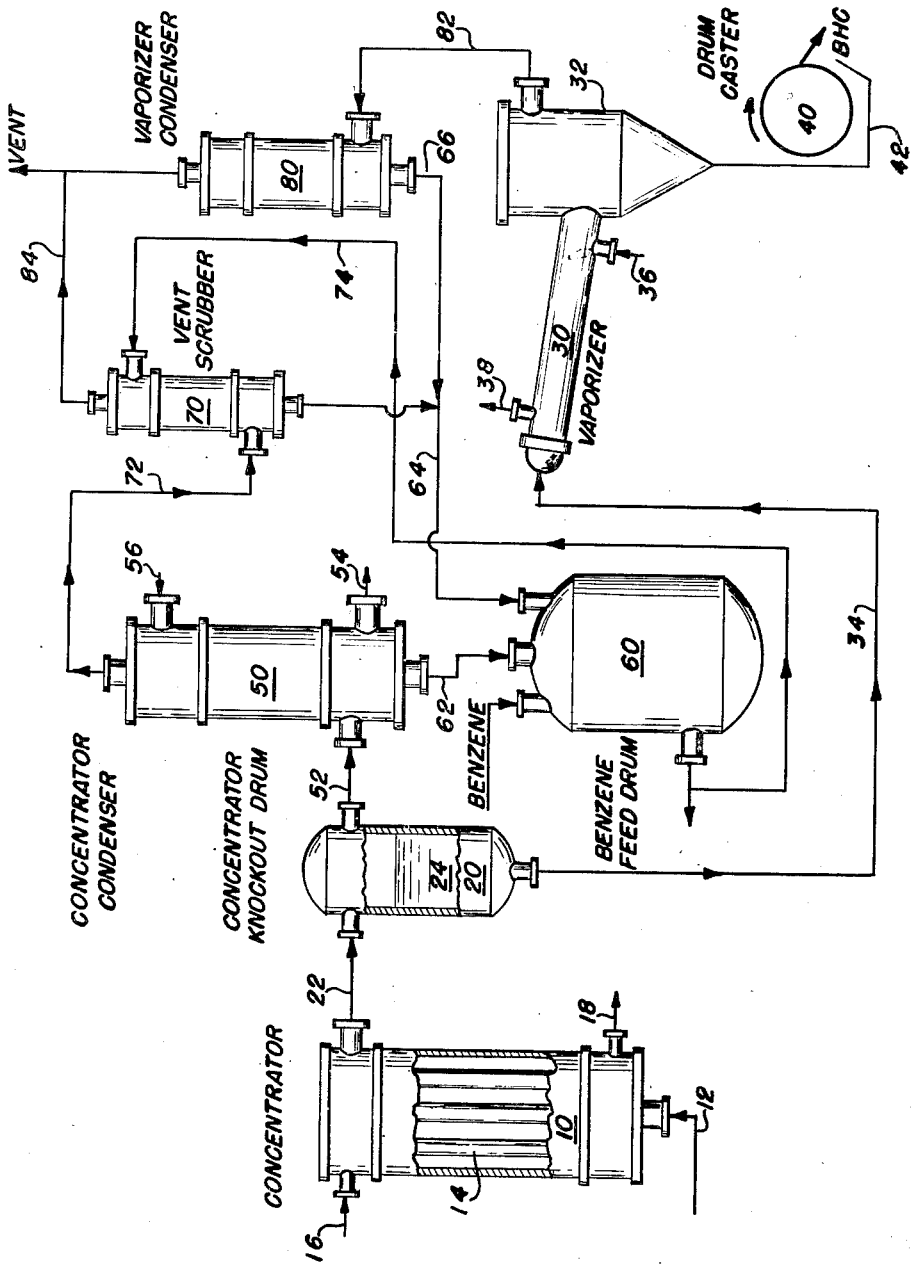

2,706,172

MANUFACTURE OF BENZENE HEXACHLORIDE

James H. Dunn, Stephen N. Hall, Leo A. Miller, and Clarence M. Neher, Baton Rouge, La., assignors to Ethyl Corporation, New York, N. Y., a corporation of Delaware Application September 23, 1952, Serial No. 311,034

2 Claims. (Cl. 204—163)

This invention relates to the manufacture of benzene hexachloride and more particularly to the recovery of benzene-free benzene hexachloride from reactor solution.

This application is a continuation-in-part of our co-pending application, Serial No. 92,268, filed May 10, 1949, now Patent 2,622,105.

In the manufacture of benzene hexachloride (BHC), benzene is reacted with chlorine in the presence of actinic light using excess quantities of benzene. The product is generally obtained as a 15 to 25 per cent solution of BHC in benzene. One method for the recovery of the benzene hexachloride product from the benzene solvent comprises scrubbing the reacted solution to remove unreacted chlorine, separating the BHC-containing benzene from the immiscible aqueous caustic phase, evaporating the benzene, and recovering the benzene hexachloride.

The above means of BHC recovery produces a high quality, white product, and provides numerous other advantages over steam distillation and similar recovery techniques, heretofore employed. However, the caustic scrubbing technique, discussed above, has a number of inherent disadvantages which reduce its value in large scale commercial operation. These disadvantages are as follows:

The valuable chlorine, dissolved in the reaction product, is degraded when neutralized with caustic soda, resulting in the formation of low-value sodium chloride;

The cost of the caustic soda, used for neutralization, is a large part of the total cost of the BHC manufacturing process;

The caustic scrubbing operation requires expensive processing equipment;

The vaporization of all of the benzene in a single step requires excessive quantities of high pressure steam.

Sodium chloride and other corrosion elements, which are dissolved in the reactor solution following caustic scrubbing, present serious corrosion problems in the final benzene vaporization operation.

It is accordingly an object of the present invention to provide an improved process for the recovery of benzene hexachloride from benzene solutions containing the same. Another object is to provide a process of the above type in which unreacted chlorine normally dissolved in the chlorination reaction product can be recovered as free chlorine. Another object is to provide an economical process of the above type which eliminates the need for a caustic wash, permits the use of low pressure steam, and reduces or eliminates corrosive materials in the reactor solution prior to vaporization of the benzene.

The present invention accomplishes all of the above objects by effecting vaporization of the benzene in a plurality of stages. Upon chlorination of benzene in a suitable reactor, the benzene reactor solution (containing benzene, BHC, chlorine, hydrogen chloride, and sometimes water) is passed into a first vaporizer wherein sufficient benzene is vaporized to remove the major quantities of dissolved chlorine and hydrogen chloride. This vaporization is preferably controlled to produce an essentially saturated solution of benzene hexachloride in benzene at the temperature of vaporization. It is not desired to remove in this step a sufficient quantity of benzene to precipitate appreciable quantities of BHC in the concentrated reactor solution. The so-concentrated solution is then passed into a second vaporizer wherein the remaining quantities of the benzene are vaporized.

The benzene reactor solution is normally essentially saturated with benzene hexachloride under the conditions of the reaction, i. e., 10–25 per cent by weight BHC in benzene. This reactor solution is then passed into the vaporizer or concentrator wherein the temperature of the reactor solution (generally above about 100° F.) is raised to a temperature between 170° and 225° F. (76°–107° C.), preferably between 170° and 190° F. (76°–88° C.). These temperatures can be somewhat lower if reduced pressures are employed. The solution in this operation is concentrated, for example, from approximately a 15 per cent by weight BHC solution to between a 30 to 50 per cent by weight BHC solution, preferably about 40 per cent by weight.

The reactor solution normally contains from 0.25 to 3 per cent chlorine, less than 1 per cent HCl, and about 1 per cent of water. These volatile impurities are removed from the reactor solution during the latter vaporization or concentration operation, and these vapors can then be recovered by any suitable recovery equipment. However, a very desirable method is disclosed hereinafter for selectively dissolving the valuable chlorine from the hydrogen chloride gas.

The concentrated benzene solution is then passed into a second vaporizer operated at a temperature between 320°–420° F. (160°–215° C.) and preferably between 350°–370° F. (176°–188° C.) wherein the remaining benzene is flashed from the BHC. The solvent-free BHC, in a molten condition at these temperatures, is then solidified and recovered. The latter recovery of the BHC can conveniently be accomplished by use of a drum flaker or similar apparatus.

A wide variety of process equipment can be employed for either the concentration operation or the final flash vaporization operation. For example, either unit can be simply a conventional heat exchanger in combination with a knockout drum or similar vessel. Details of a highly desirable process and apparatus for the final vaporizer is disclosed in U. S. Patent No. 2,564,406.

For a better understanding of the operation of the invention, one modification of a suitable process flow diagram and apparatus is illustrated in the drawing. The main units of equipment for the benzene vaporization operation are the concentrator 10, a concentrator knockout drum 20, a flash vaporizer 30, including a knockout drum 32 and a drum flaker or caster 40. The main vapor recovery units are a concentrator condenser 50, a benzene feed drum 60, a vent scrubber 70 and a vaporizer condenser 80.

A benzene-BHC reactor solution, obtained by any suitable process, is passed into the bottom of the concentrator 10, through the line 12. The concentrator, as shown, is a tube bundle heat exchanger. The benzene solution flows upwardly through the plurality of tubes 14. Steam or other heat transfer medium enters the jacket of the concentrator 10 through line 16 and leaves through the line 18. The mixture of vapors and concentrated BHC solution is then passed through line 22 into the concentrator knockout drum 20 where the phases are separated. The concentrated BHC solution 24 then flows to the flash vaporizer 30, through the line 34, wherein the remaining benzene is flashed. This vaporizer is also shown as a tube bundle heat exchanger in which the BHC solution flows through a plurality of tubes (not shown). A heat transfer medium, preferably high pressure steam, enters the jacket of the flash vaporizer through the line 36 and leaves the same through the line 38. Molten BHC separates from the benzene vapors in the vaporizer knockout drum 32 and is solidified and flaked by the drum caster 40. In the latter operation, molten BHC in the pan 42 freezes on the cooled roller and is flaked off therefrom by a knife or similar scraper.

The vapors formed in the concentrator 10 and separated from the liquid phase in the knockout drum 20 are passed to the concentrator condenser 50, through the line 52. This condenser is shown in the drawing as a tube bundle heat exchanger, and is cooled by any suitable cooling medium, flowing through the lines 54 and 56. Condensed vapors, primarily benzene, are returned to the benzene feed drum 60, through the line 62. The uncondensed vapors are passed from the concentrator condenser 50 to the vent scrubber 70, through the line 72, wherein the vapors are scrubbed essentially free of chlorine with fresh benzene. The fresh benzene enters the vent scrubber 70 through the line 74 from the benzene feed drum 60. The benzene solution containing the unreacted chlorine is returned to the benzene feed drum 60 through the line 64. The so-crubbed gases, primarily hydrogen chloride, are then recovered or disposed of by any suitable means.

The benzene vaporized in the flash vaporizer and separated from the molten BHC in the knockout drum 32 is passed into the vaporizer condenser 80 through line 82. The condensed benzene vapors are returned through line 66 to the benzene feed drum.

The following is a working example of a commercial scale recovery operation. A benzene reactor solution containing 17 weight per cent BHC is fed to the concentrator 10 through the line 12, at a rate of 23,590 parts by weight/hour. The solution also contains about 3 per cent by weight of chlorine and traces of water and HCl at 2″ of water pressure. This reactor solution has a temperature of 90° F.

In the concentrator 10, the temperature of the solution is raised to 187° F. The mixture of concentrated solution and vapor formed therein is then separated in the BHC concentrator knockout drum 20. The concentrated feed, 40 per cent by weight BHC in benzene, is passed to the flash vaporizer 30 through the line 34 at the rate of 9,200 parts by weight/hour and is essentially free of chlorine, HCl or water. In the flash vaporizer 30, the temperature of the solution is raised to about 360° F. At this temperature, the benzene and molten BHC are separated in the knockout drum 32, and the BHC is recovered as a white, flaky product from the drum caster 40 at the rate of 3,425 parts by weight/hour. The valuable unreacted chlorine, about 100 parts by weight/hour, is recovered in the vent scrubber 70. The vapor phase from the concentrator knockout drum 20 is fed at the rate of 14,440 parts by weight/hour to the concentrator condenser wherein essentially all benzene is condensed and returned through the line 62 to the benzene feed drum 60. The temperature of this condensation is 176° F. The uncondensed phase containing the chlorine is then passed through the line 72 to the vent scrubber wherein cool (100° F.) benzene from the benzene feed drum 60 is used to scrub the vapors. This benzene passes through the line 74. The benzene containing the chlorine is then returned to the benzene feed drum through the line 64.

As is believed apparent from the foregoing, the present invention provides an improved process for the economical recovery of BHC from solutions thereof in benzene whereby a white, flaky BHC product can be obtained. This process, in contrast to prior processes, permits the recovery of unreacted gaseous chlorine from a BHC reactor solution, eliminates corrosive conditions during the final flash vaporization of benzene from the BHC and permits the use of low temperature steam for vaporization of large quantities of the benzene solvent.

We claim:

1. A process for the manufacture of crude benzene hexachloride comprising chlorinating benzene in the presence of actinic light to produce a product containing benzene hexachloride, hydrogen chloride and unreacted chlorine dissolved in benzene, thereafter vaporizing a first portion of the benzene, the hydrogen chloride and the unreacted chlorine at a temperature between about 170° to 225° F. to concentrate the benzene hexachloride in benzene solution, heating the so-concentrated solution to a temperature between about 350°–370° F. to remove the remaining benzene and recover the crude benzene hexachloride, cooling the vapors containing the first portion of benzene, the hydrogen chloride and chlorine to condense and separate the benzene from the unreacted chlorine and hydrogen chloride, scrubbing the uncondensed vapors with cool benzene to selectively dissolve the unreacted chlorine from the hydrogen chloride, and recycling the benzene used in the scrubbing operation and containing the unreacted chlorine for further chlorination.

2. A process for the manufacture of crude benzene hexachloride comprising chlorinating benzene in the presence of actinic light to produce a product containing benzene hexachloride, hydrogen chloride and unreacted chlorine dissolved in benzene, thereafter vaporizing a first portion of the benzene, the hydrogen chloride and the unreacted chlorine at a sufficiently high temperature to concentrate the benzene hexachloride in benzene solution, heating the so-concentrated solution to a substantially higher temperature sufficient to remove the remaining benzene and recover the crude benzene hexachloride, cooling the vapors containing the first portion of benzene, the hydrogen chloride and chlorine to condense and separate the benzene from the unreacted chlorine and hydrogen chloride, scrubbing the uncondensed vapors with cool benzene to selectively dissolve the unreacted chlorine from the hydrogen chloride, and recycling the benzene used in the scrubbing operation and containing the unreacted chlorine for further chlorination.

References Cited in the file of this patent

UNITED STATES PATENTS

| 2,628,260 | Britton et al. | Feb. 10, 1953 |

FOREIGN PATENTS

| 646,917 | Great Britain | Nov. 29, 1950 |
| 655,686 | Great Britain | Aug. 1, 1951 |